United States Patent [19]

Kallenbach et al.

[11] Patent Number: 5,676,828
[45] Date of Patent: Oct. 14, 1997

[54] APPARATUS AND METHOD FOR MODIFYING WASTE WATER

[75] Inventors: Thomas J. Kallenbach; Justin M. Buchanan; Matthew H. Goodrich, all of Bozeman; Ronald V. Skinner, Ronan; Greg R. Poncelet; Trina J. Kallenbach, both of Bozeman, all of Mont.

[73] Assignee: Fluidyne, Inc., Bozeman, Mont.

[21] Appl. No.: 630,563

[22] Filed: Apr. 10, 1996

Related U.S. Application Data

[63] Continuation of Ser. No. 382,260, Feb. 1, 1995, Pat. No. 5,534,417.

[51] Int. Cl.$^6$ .................................................. C02F 3/30
[52] U.S. Cl. .......................... 210/117; 210/119; 210/120; 210/170; 210/195.1; 210/196; 210/202; 210/258; 210/260; 210/532.2; 210/903; 137/590
[58] Field of Search ........................ 210/109, 117, 210/120, 170, 15.1, 196, 202, 248, 258, 260, 532.2, 903, 119; 137/587, 590, 592

[56] References Cited

U.S. PATENT DOCUMENTS

| | | |
|---|---|---|
| 2,711,252 | 6/1955 | Oliver ............................ 137/587 |
| 3,681,236 | 8/1972 | Bergles et al. . |
| 4,039,451 | 8/1977 | Smith . |
| 4,042,497 | 8/1977 | Maltby .......................... 210/109 |
| 4,092,249 | 5/1978 | La Gatta . |
| 4,160,724 | 7/1979 | Laughton . |
| 4,183,810 | 1/1980 | Baenens et al. . |
| 4,251,359 | 2/1981 | Colwell et al. . |
| 4,439,323 | 3/1984 | Ball . |
| 4,465,594 | 8/1984 | Laak . |
| 4,479,876 | 10/1984 | Fuchs . |
| 4,571,302 | 2/1986 | Willson ........................ 210/117 |
| 4,793,386 | 12/1988 | Sloan . |
| 4,818,384 | 4/1989 | Mayer . |
| 4,822,485 | 4/1989 | Mayer . |
| 4,826,601 | 5/1989 | Spratt et al. . |
| 4,895,645 | 1/1990 | Zorich, Jr. . |
| 5,030,353 | 7/1991 | Stuth . |
| 5,160,043 | 11/1992 | Kos . |
| 5,185,080 | 2/1993 | Boyle . |
| 5,200,081 | 4/1993 | Stuth . |
| 5,288,407 | 2/1994 | Bodwell et al. . |
| 5,318,699 | 6/1994 | Robertson et al. . |
| 5,343,905 | 9/1994 | Gryc et al. ..................... 137/587 |
| 5,348,653 | 9/1994 | Rovekl . |
| 5,360,556 | 11/1994 | Ball et al. . |
| 5,480,561 | 1/1996 | Ball et al. ...................... 210/196 |
| 5,501,790 | 3/1996 | Wiedermann ................ 210/109 |
| 5,543,043 | 8/1996 | Bates et al. ................... 210/109 |

*Primary Examiner*—Neil McCarthy
*Assistant Examiner*—Theodore M. Green
*Attorney, Agent, or Firm*—Merchant, Gould, Smith, Edell, Welter & Schmidt, P.A.

[57] ABSTRACT

An apparatus and method for modifying waste water to reduce nitrate content and biochemical oxygen demand is provided. The apparatus includes an ammonification and denitrification region having a substantially anaerobic environment, a nitrification region having a substantially aerobic environment, and an effluent drainage region. Effluent circulates through the ammonification and denitrification region and the nitrification region to convert organic nitrogen-containing compounds in waste water to nitrogen gas and carbon dioxide.

8 Claims, 8 Drawing Sheets

APPARATUS AND METHOD FOR MODIFYING WASTE WATER

This is a continuation of application Ser. No. 08/382,260, filed Feb. 1, 1995, U.S. Pat. No. 5,534,417.

FIELD OF THE INVENTION

The present invention relates to an apparatus and method for modifying waste water, and more particularly, to an apparatus and method for treating waste water containing nitrogenous compounds and carbonaceous compounds to reduce nitrate content and biochemical oxygen demand.

BACKGROUND OF THE INVENTION

Public or community sewage treatment is not available to all houses and businesses. As a result, many houses and businesses must utilize an on-site septic system for sewage treatment and disposal. A conventional on-site septic system includes a septic tank which receives domestic sewage from the home or business, and a soil absorption field or drain field where sewage flows from the septic tank and where treatment of the sewage takes place due to the presence of microbes which act on the sewage to metabolize the carbon and nutrients. Sink waste, toilets, shower/bath, and laundry wash water are the usual contributions to domestic sewage. The septic tank generally functions to separate the solid matter and aqueous fraction into three distinct layers or phases within the tank due to differing densities, settling velocities and detention time. These phases include a solids phase, an aqueous phase, and an oil phase. Generally, it is the middle, aqueous phase that is intended to flow into the soil absorption field.

Conventional septic systems can be quite effective for treating sewage given ideal site conditions. If, however, site conditions and/or temperatures are less than favorable, there exists the potential for inadequate sewage treatment which may result in contamination of ground water and surface water. Even if site and temperature conditions are desirable, sewage from conventional septic systems may leach through the soil and contaminate ground water in areas with particularly high water tables. Accordingly, it would be desirable to provide a sewage treatment system which can treat sewage even under adverse site conditions to provide effluent sufficiently free of contaminants which could enter into ground water and contaminate the ground water supply.

One compound present in the waste water stream that causes particular concern is the nitrate ion, ($NO_3^-$). Nitrate is often used as an indicator of waste water contamination and is listed as a contaminant that renders water unfit for human consumption if its concentration in a water supply exceeds 10 parts per million. Because nitrate ions are highly soluble in water and are negatively charged, they have a tendency to be repelled by negatively charged soil particles and are easily carried away from soil with water. Accordingly, it would be desirable to provide a system which reduces nitrate in waste water.

Also of concern is the levels of biological oxygen demand (BOD) in the sewage from conventional septic systems. One technique to decrease the level of BOD in septic tank sewage is to process the sewage through a sand filter prior to allowing it to enter the drain field. Such a system significantly reduces the BOD. Nitrogen, however, in its various forms, will not be completely removed by a sand filter, and may ultimately enter the ground water. Additionally, a conventional sand filter may become clogged after a relatively short period of time, requiring replacement of the filter media.

Recirculating sand filters and intermittent sand filters for septic systems are sometimes used where drainage fields are inadequate or not practical. In these systems, sewage flows to a septic tank which provides initial treatment. The septic effluent is discharged into a recirculating pump tank which is provided with a pump controlled by a timer to periodically dose a recirculating sand filter. After the effluent is distributed over the sand filter, the filtrate is collected and directed back through the recirculating pump where a recirculation valve either returns it to the pump tank or discharges the effluent for final treatment and disposal. In an intermittent sand filter the recycle ratio is 1:1, i.e., the waste water makes only one pass through the filter. Unfortunately, sand filters can be very expensive and are generally not effective at reducing nitrate concentration. Accordingly, it would be desirable to provide a system which reduces nitrate concentration in a physically smaller and less costly process unit.

Attached growth and suspended growth systems have been developed to reduce nitrate concentration. In attached growth systems, coarse granular media provides a large surface area for microbial growth within a nitrification unit. Suspended growth systems are commonly referred to as sequencing batch reactors or aerobic package plants. Generally, these systems function by accepting an entire daily flow of domestic sewage into one compartmentalized tank. In a general scheme of operation, the tank is filled with a daily supply of sewage. A mechanical air compressor and/or effluent pump forces air into the tank thereby creating an aerobic and highly agitated environment. At a certain point, the compressor or pump shuts down and the liquid is allowed to become quiescent. The liquid is then disposed to a drain field. These systems are disadvantageous because they are costly and complicated, and because they do not remove an adequate amount of nitrate without requiring the addition of a carbon source.

The Ruck system was designed to reduce nitrogen concentration in waste water by providing both an aerobic and anoxic step. These steps are combined within a single, separate tank as described in U.S. Pat. No. 4,465,594. This system requires splitting waste water flow into two streams, a black water stream and a grey water stream. If the waste water stream is not split, chemical addition for a source of carbon denitrification is needed. Separate septic tanks are used for the black water stream and the grey water stream. The nitrification unit uses "in-drains" which add to the overall complexity of the system. Air is supplied only passively through exposed vents, and no protection against cold air intrusion into the system is provided. In view of this complexity, the Ruck system is fairly expensive.

Accordingly, it would be desirable to provide a system for removing nitrates and reducing biological oxygen demand to acceptable levels using a system which is easy to install, requires minimal maintenance, and which does not require the addition of chemicals. In particular, it is desirable to provide a system which exploits the naturally occurring conditions in the treatment of sewage.

SUMMARY OF THE INVENTION

According to the present invention, an apparatus is provided for modifying waste water. The apparatus includes an ammonification and denitrification region having a substantially anaerobic environment, a nitrification region having a substantially aerobic environment, and an effluent drainage region. The ammonification and denitrification region includes a first inlet for receiving raw sewage, a second inlet for receiving nitrified effluent, a first outlet and conduit connecting the ammonification and denitrification region to the nitrification region, a pump in the ammonification and denitrification region for pumping clarified effluent through the first outlet and conduit, and a second outlet and conduit for discharging clarified effluent to the effluent drainage region. The nitrification region includes a biological reaction area, an effluent distribution network constructed and arranged to distribute clarified effluent into the biological reaction area, an air distribution network constructed and arranged to distribute air into the biological reaction area, and a collection network constructed and arranged for collecting nitrified effluent from the biological reaction area and discharging to the ammonification and denitrification region. The effluent drainage region includes an absorption field for discharging clarified effluent.

The ammonification and denitrification region can include a settling tank or septic tank and a recirculation tank constructed in series. In such a case, the settling tank can include the first inlet and the second inlet, and a third outlet and conduit for communication with the recirculation tank. Preferably, settling tank or septic tank is constructed and arranged to provide gentle mixing of the raw sewage and the nitrified effluent and settling of heavy components. The recirculation tank can include the first outlet and conduit and the second outlet and conduit, and an inlet for communication with the settling tank.

The apparatus for modifying waste water preferably includes, within the nitrification region further, a container for alternately filling with air and clarified effluent. The container can be constructed and arranged for distributing clarified effluent to the effluent distribution network and for distributing air to the air distribution network. Preferably, the container for alternately filling with air and effluent includes: an effluent inlet/outlet which provides effluent under pressure to the container and which allows effluent to drain from the container; an air inlet having a valve which closes as effluent under pressure enters the container and which opens the air inlet when effluent drains from the container; an air outlet having a valve which opens as effluent under pressure enters the container and which closes as effluent drains from the container; and an effluent outlet constructed and arranged to allow effluent to exit the container when the container is filled with effluent and effluent under pressure enters the container.

Through a series of biological reactions, organic nitrogenous compounds present in raw sewage can be converted to nitrogen gas and released to the atmosphere. Certain biological reactions are favored in an aerobic (oxygen rich) environment, and other reactions are favored in an anaerobic or anoxic (oxygen deficient) environment. These biological reactions include ammonification, nitrification, and denitrification. Ammonification generally takes place in both aerobic and anoxic environments; nitrification generally takes place in aerobic environments; and denitrification generally takes place in anoxic environments. Accordingly, the phrase "substantially aerobic" is meant to describe an environment where aerobic biological reactions are favored, and the phrase "substantially anaerobic" describes an environment where anaerobic reactions are favored.

Upon completion of the nitrification/denitrification processes, the waste water is significantly reduced in nitrogen content which means reduced nitrate content.

According to the present invention, a method is provided for modifying waste water. The method includes the steps: feeding waste water containing organic nitrogenous compounds and carbonaceous compounds and feeding effluent containing nitrate compounds to an ammonification and denitrification region to effect ammonification of organic nitrogenous compounds and denitrification of nitrate compounds; separating clarified effluent containing ammonium therefrom; feeding clarified effluent containing ammonium to a nitrification region to convert ammonium to nitrate compounds; and feeding clarified effluent containing ammonium to an effluent drainage region. The ammonification and denitrification region can be substantially an anaerobic environment, and the nitrification region can be substantially an aerobic environment. Preferably, the waste water is domestic or business sewage.

The effluent containing nitrate compounds is obtained by nitrification of clarified effluent containing ammonium. The nitrate concentration in clarified effluent can be controlled by controlling the recirculation ratio. Preferably, the recirculation ratio is controlled to be adove about 2:1. More preferably, the recirculation ratio is controlled between about 5:1 to about 10:1, and even more preferably about 7:1. The biochemical oxygen demand can be controlled by controlling the recirculation ratio, and preferably by controlling the recirculation ratio to above about 5:1.

According to the present invention, an apparatus is provided for distributing effluent and air to an environment. The apparatus includes a container for alternately filling with air and effluent. The container includes: an effluent inlet/outlet which provides effluent under pressure to the container and which allows effluent to drain from the container; an air inlet including a valve which closes as effluent under pressure enters the container and which opens when effluent drains from the container; an air outlet includes a valve which opens as effluent under pressure enters the container and which closes as effluent drains from the container; and an effluent outlet constructed and arranged to allow effluent to exit the container when the container is filled with effluent and effluent under pressure enters the container. Preferably, the air inlet valve is a swing check valve, the air outlet valve is a floating ball valve, and the effluent outlet includes an air lock to prevent air from exiting the container therethrough. The air lock can be a p-trap.

DETAILED DESCRIPTION OF THE INVENTION

As required, a detailed description of preferred and alternate embodiments is presented herein. The description provided is not intended to be limiting, but rather to serve as a presentation by example of embodiments in which the subject matter claimed may be applied.

The General Configuration of the Overall System

Figure 1:
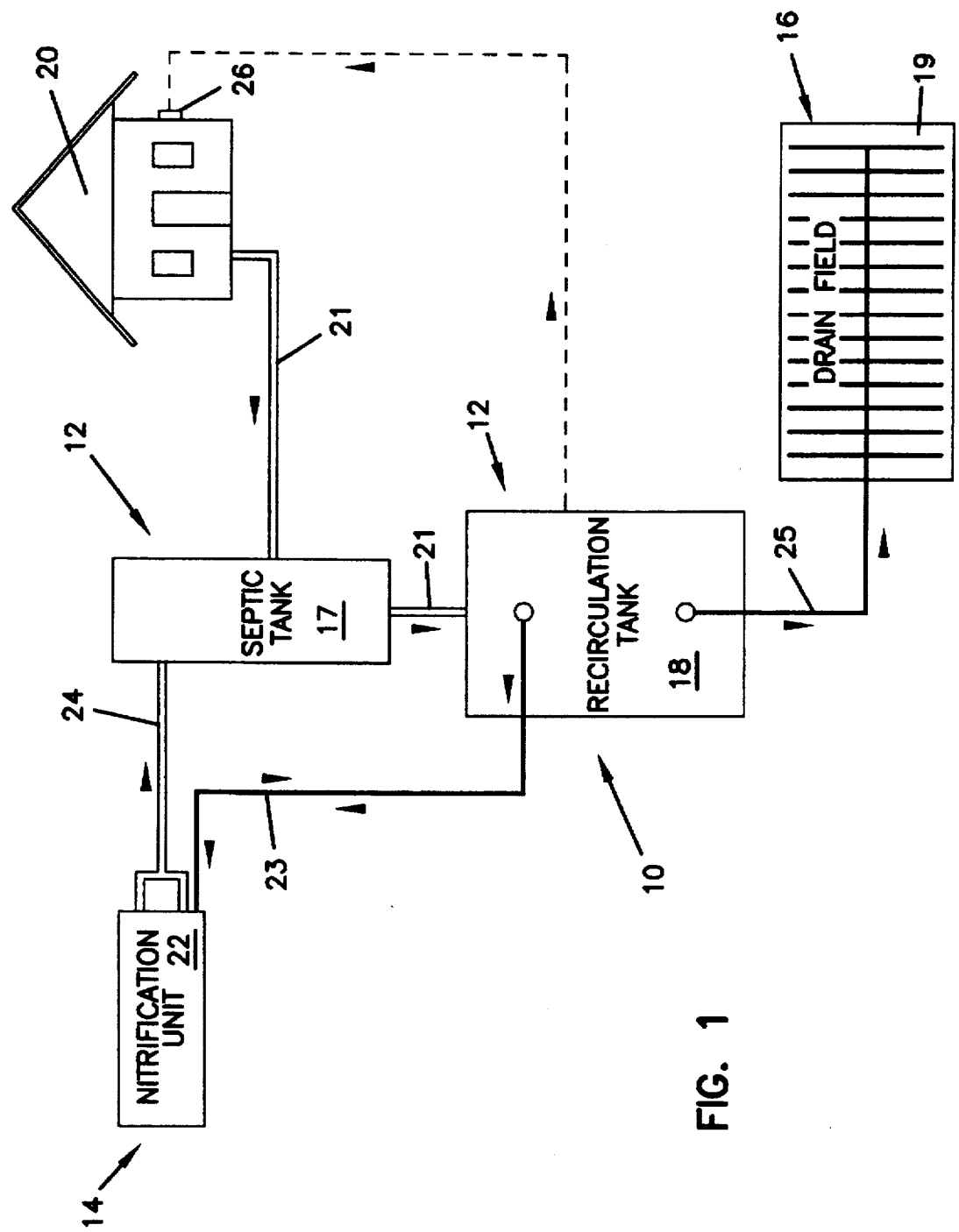
FIG. 1 is a plan schematic view of a waste water treatment system according to the principles of the present invention.

The reference numeral 10, FIG. 1, generally designates a waste water treatment system for residential or business application according to the principles of the present invention. The waste water treatment system 10 has defined therein three general operational regions: an ammonification and denitrification region 12; a nitrification region 14; and a draining or dispersing region 16. Each of regions 12, 14, and 16 can be constructed and assembled together to provide a waste water treatment system, or certain regions can be combined with pre-existing components of a septic system to provide a waste water treatment system. For example, as shown in FIG. 1, pre-existing septic tank 17 can be modified and combined with recirculation tank 18 to provide ammonification and denitrification region 12, and pre-existing drain field 19 can be converted to draining or dispersing region 16.

Herein the phrase "waste water" is meant to include any waste stream containing organic nitrogenous compounds and a source of carbon. It is to be understood that waste water includes domestic and business sewage and waste. The waste water can include liquid and solid components, and can be a single phase or in the form of an emulsion, a dispersion, or a mixture of phases. It will be understood that the term "modifying" is meant to embrace biological reactions which transform the components of the waste water into an ultimately more environmentally friendly product. In particular, it is meant to describe a process for converting nitrogen in nitrogenous compounds present therein to nitrogen gas, and for reducing the carbonaceous compounds to carbon dioxide and water which reduces biochemical oxygen demand (BOD). Generally, the modification can be accomplished by microorganisms present in the waste water. It will be understood that the reference to "effluent" as used herein refers to the waste water or any modification thereof at any given point along the waste water treatment system. In particular, "clarified effluent" refers to effluent subjected to a degree of ammonification and denitrification and "nitrified effluent" refers to effluent subjected to a degree of nitrification. Generally, clarified effluent flows from and through the ammonification and denitrification region 12, and the nitrified effluent flows through and from the nitrification region 14. The effluent, whether clarified or nitrified, can contain dissolved solid particles and small particles which have not settled out. In general, clarified effluent will not contain large amounts of solid undissolved particles which will normally settle out in the septic tank or settling tank. It is understood that the term "quiescent" is meant to describe a state of low turbulence whereby settling velocities are generally greater than flow or horizontal velocities. Generally, a quiescent system provides for settling of solid particles.

Still referring to FIG. 1, the arrows indicate direction of bulk flow of effluent to and from each of the general regions in waste water treatment system 10. Consider the fate of a volume of domestic raw sewage as it leaves the house or business location 20 and is processed through waste water treatment system 10. Assume the septic tank 17 and recirculation tank 18 are full and quiescent. Domestic raw sewage enter septic tank 17 through sewage line 27. Solids settle to the bottom, greases, oils and soap float to the surface. Clarified effluent flows from the septic tank 17 through clarified effluent line 21 into the recirculation tank 18. Clarified effluent from the recirculation tank 18 is intermittently pumped into the nitrification unit 22 through the pressurized line 23. As indicated by the arrows along the pressurized line 23, the primary flow of clarified effluent is from the recirculation tank 18 to the nitrification unit 22. When the pump stops, effluent in line 23 drains into the recirculation unit 18 as will be described in more detail hereinbelow. Nitrified effluent flows from nitrification unit 22 through nitrified effluent line 24 back to septic tank 17 where it is combined with domestic raw sewage from the house or business location 20. Clarified effluent from the septic tank 17 may then be processed any number of times through the recirculation tank 18, the nitrification unit 22 and septic tank 17 until a predetermined degree of modification has been achieved. Effluent having a predetermined degree of modification is pumped through drain field line 25 into drain field 19 where it is absorbed. The intermittent pumping of clarified effluent into the nitrification unit 22 is controlled by the control panel 26 which signals pumps in the recirculation tank 18 to initiate and cease operating.

Referring now to FIGS. 2-5, the general regions of the waste water treatment system 10 will be described in greater detail. The ammonification and denitrification region 12 includes septic tank 17 which is configured to accept and provide gentle mixing of raw domestic sewage from the house or business location 20 and nitrified effluent from the nitrification unit 22, and the recirculation tank 18 which contains clarified effluent substantially separated from the heavy solids settled in the septic tank 17. The environment in both the septic tank 17 and the recirculation tank 18 is substantially anaerobic and rich in carbon because the conditions provided effect an anaerobic environment.

As the raw sewage and/or nitrified effluent enters the septic tank 17, mild or gentle mixing occurs which causes carbon containing particles to disperse with the nitrified effluent. At the same time, the heavy solids tend to settle in a solids phase at the bottom of the septic tank 17. The septic tank can be referred to as a settling tank or a gentle mixing tank, and it is generally quiescent. As with conventional septic tanks, the septic tank 17 is provided with a lid 30 for periodic removal of settled solids therefrom. The clarified effluent can contain large amounts of carbon containing particles as well as bacteria and other components normally found in the aqueous phase of waste water. Baffle 31 helps prevent the oil or lighter phases from flowing into the recirculation tank 18.

Clarified effluent flows by gravity feed through clarified effluent line 21 into the recirculation tank 18. An electrical junction box 32 is provided which is electrically connected to control panel 26 which triggers effluent pump 34 and drain field pump 36 to begin and cease operation according to a predetermined program. Block 37 is provided to keep effluent pump 34 and drain field pump 36 off the bottom of the recirculation tank 18 and away from solids which may potentially settle therein. Lid 38 is provided for periodic cleaning and/or removal of settled solids, and for servicing the pumps.

Effluent pump 34 pumps clarified effluent through pressurized line 23 into lung 40 in nitrification unit 22. Drain field pump 36 pumps clarified effluent through drain field line 25 to the drain field. On float 39 is provided for turning on drain field pump 36. When the clarified effluent level reaches a predetermined level, on float 39 triggers pump 36 to deliver clarified effluent to the drain field. Once the clarified effluent level is lowered to a predetermined level, off float 41 triggers the pump to shut off. Alarm float 43 is provided to indicate a problem when the clarified effluent level reaches a level beyond the on float level. Alarm float 43 triggers an alarm in control panel 26. The control panel 26 can contain a current sense relay which senses operation of the effluent pump 34. If the relay has not sensed that the pump has been activated when appropriate, it will shut the entire system down.

Lung 40 is provided for distributing air inside nitrification unit 22. The lung 40 provides aeration of the nitrification unit 22 by filling with clarified effluent and displacing air therein which flows into the nitrification unit. As shown in more detail in FIG. 3, lung 40 is provided having a pressurized line 23 with perforations 41 inside lung 40 which allows clarified effluent to fill lung 40 and displace air contained therein previously. As clarified effluent fills lung 40, swing check valve 42 swings into place closing off lung vent 44 which is vented to the atmosphere via gravel fill 45. It is the clarified effluent flowing under pressure through pressurized line 23 which closes swing check valve 42. A standard swing check valve, such as one manufactured by KBI, can be used. Air present within the lung 40 is forced out through air distribution network 46 and thereby aerates the nitrification unit 22. Once lung 40 is filled with clarified effluent, floating ball valve 48 seals the air distribution network 46 so that clarified effluent does not flow into the air distribution network 46. Instead, clarified effluent flows through effluent distribution network 50 into the nitrification unit 22. Once a predetermined amount of effluent has entered effluent network 50, effluent pump 34 shuts off and effluent drains through pressurized line 23 back to recirculation tank 18. As the clarified effluent leaves lung 40, swing check valve 42 opens allowing air to enter lung 40 through lung vent 44 and thereby displace clarified effluent draining therefrom. Floating ball valve 48 falls under gravity and seals the air distribution network 46. The process of filling the lung 40 with clarified effluent may be repeated any number of times to provide desired aeration of the nitrification unit 22 and/or dosage of clarified effluent.

Advantageously, lung vent 44 is vented to gravel fill 45 to protect the nitrification unit from extremely cold air. Generally, the gravel fill will have an average diameter which allows sufficient amounts of air to diffuse therein from the atmosphere. In a preferred embodiment, the gravel fill will have an average diameter of between ½" and ¾".

Figure 4:
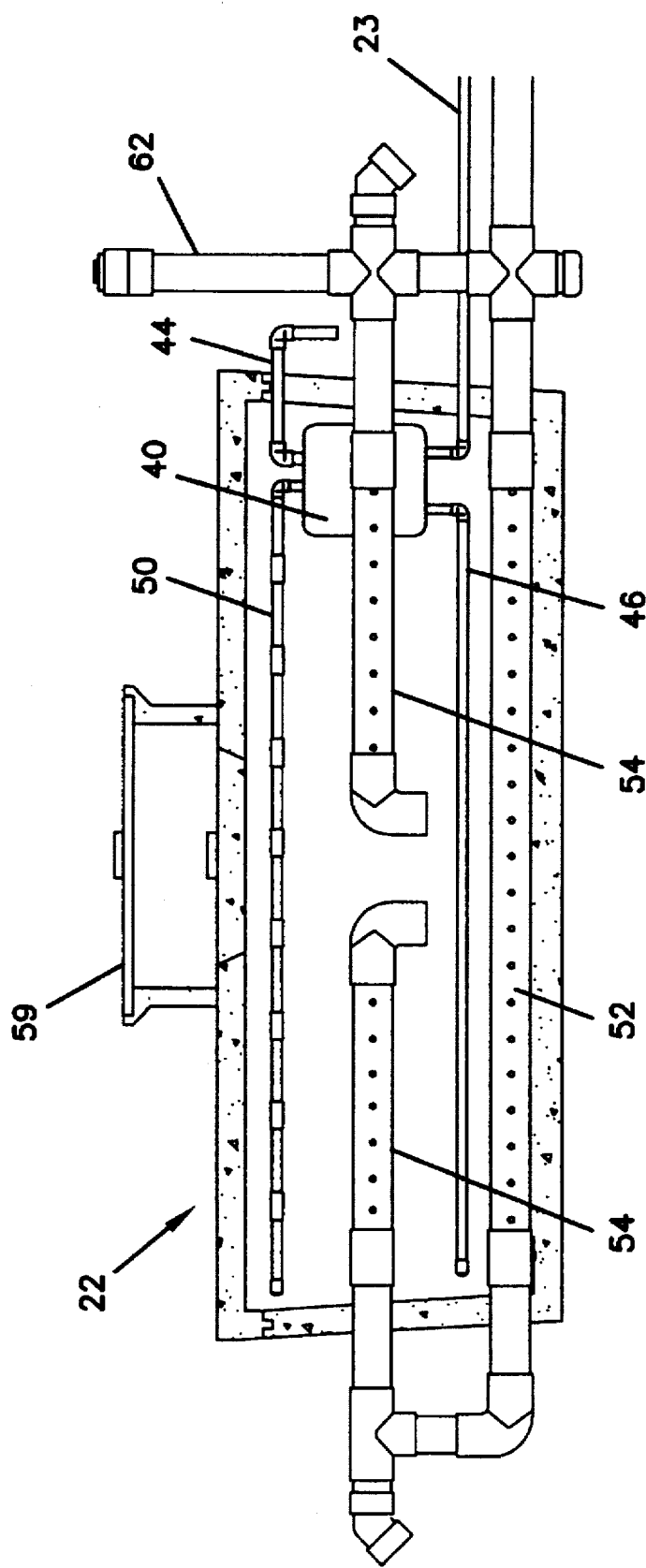
FIG. 4 is a cross-sectional view of the nitrification unit shown in FIG. 1.
Figure 5:
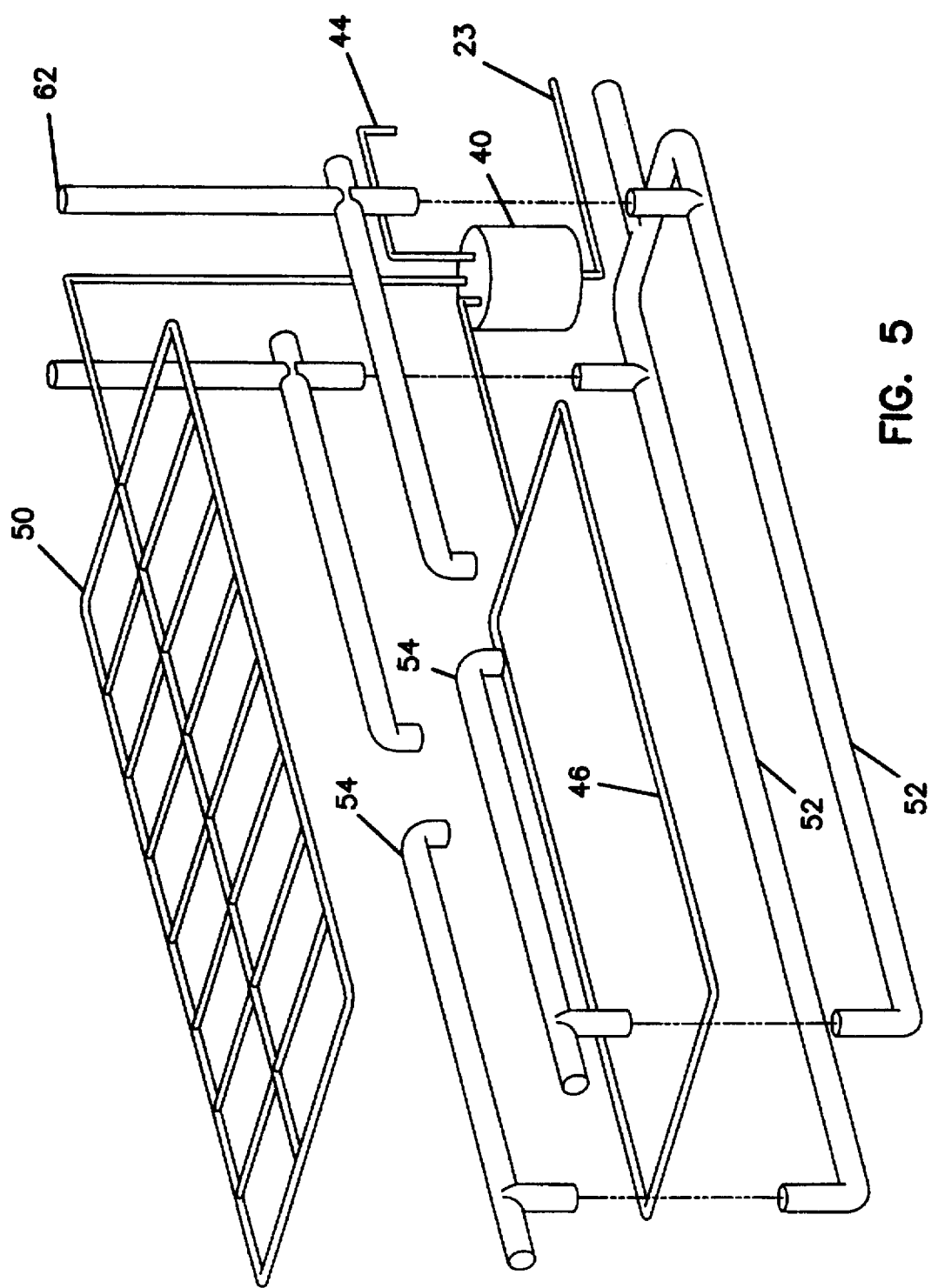
FIG. 5 is an exploded view of the nitrification unit shown in FIG. 4.

The relationship between the air distribution network 46, the effluent distribution network 50, and the effluent collection lines 52, and passive vent tubes 54 are provided in detail in FIGS. 4 and 5. As effluent leaves effluent distribution network 50 through tiny perforations, it passes through biological reaction area 56 where nitrification generally occurs in an aerobic environment. As air leaves air distribution network 46 through tiny perforation, it passes through biological reaction area 56. Passive vent tubes 54 are provided for additional aeration of the biological reaction area 56. The biological reaction area 56 is preferably capable of providing a porous media for adequate aeration of clarified effluent to encourage microorganisms within the clarified effluent to provide nitrification and/or for allowing microorganisms attached to the porous media to provide nitrification. Preferably, the media includes about ⅜" minus rock chips which are aerated by air through air distribution network 46. Preferably, the biological reaction area 56 should be kept moist and wet to prevent stressing thereof. In a preferred embodiment, clarified effluent will flow over the area at least about once an hour, more preferably 2 to 6 times an hour. Nitrified effluent is collected through effluent collection lines 52 and returned through nitrified effluent line 24 to septic tank 17. Gas trap 33 is provided to prevent the anaerobic and aerobic environments from mixing. The nitrified effluent then mixes with raw sewage from the house or business location 20 and is subjected to ammonification and denitrification.

Nitrification unit 22 additionally is insulated with foam insulation 58 for protection against extreme cold weather. Preferably, the foam insulation is 2" extruded insulation. Lid 59 is provided for accessing the nitrification unit 22 for cleaning and maintenance. Sandy loam backfill is included to provide for sufficient aeration into the gravel fill 45. A porous filter fabric is provided at the sandy loam/gravel fill interface to prevent migration of soil particles to the intersticial spaces in the gravel. Sampling port 62 is provided for recovering a sample of nitrified effluent.

When a predetermined concentration of nitrate and/or biochemical oxygen demand is achieved in recirculation tank 18, drain field pump 36 pumps a predetermined amount of effluent to drain field 19. Drain fields can be have various designs due to different site conditions. In general, a drain field or soil absorption field includes a buried perforated pipe bedded in gravel or some other granular material. The excavation can be configured as a trench, pit, or bed.

Operation Of The Waste Water Treatment System And Alternative Embodiments

The waste water treatment system according to the present invention advantageously utilizes a series of biological reactions in modifying organic nitrogenous compounds present in raw sewage to nitrogen gas, carbon dioxide and water which can be released to the atmosphere. The basic raw materials which are utilized in the system of the present invention include proteins, amino acids, urea, oxygen and a carbon source. Certain biological reactions are favored in an aerobic (oxygen rich) environment, and other reactions are favored in an anaerobic or anoxic (oxygen deficient) environment. The system of the present invention advantageously encourages several different biological reactions by providing an environment which is favorable therefor. These biological reactions include ammonification, nitrification, and denitrification. Ammonification generally takes place in both aerobic and anoxic environments; nitrification generally takes place in aerobic environments; and denitrification generally takes place in anoxic environments.

Referring to FIG. 1, in the ammonification and denitrification region 12, the microorganisms present cause the organic nitrogenous compounds present, such as protein, urea and amino acids, to form ammonium, and causes the nitrate and carbon source to form nitrogen gas and carbon dioxide. Since the environment therein is generally anaerobic, ammonification and denitrification reactions are favored. In the nitrification region 14, the environment is primarily aerobic which favors the nitrification reaction whereby ammonium is transformed to nitrite and then to nitrate.

The ammonification reactions involve the transformation of organic nitrogenous compounds to inorganic ammonium ($NH_4^+$). Generally, the nitrogenous compounds can be present as organic compounds in the domestic raw sewage. The ammonification reactions can be driven by a wide variety of microorganisms including bacteria, actinomycetes, and fungi which can function in both aerobic and anaerobic conditions. Ammonification microorganisms are well known in the art. Proteins and urea contain the bulk of the nitrogen found in raw waste water. Their transformations are described by the following reactions:

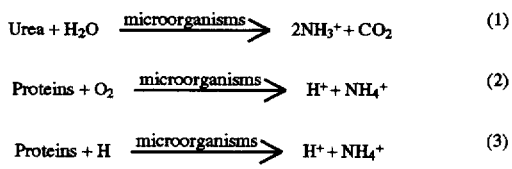

(1) Urea + $H_2O$ $\xrightarrow{microorganisms}$ $2NH_3^+ + CO_2$ (2) Proteins + $O_2$ $\xrightarrow{microorganisms}$ $H^+ + NH_4^+$ (3) Proteins + H $\xrightarrow{microorganisms}$ $H^+ + NH_4^+$ The nitrification reaction generally involves the conversion of ammonium ($NH_4^+$) to nitrate ($NO_3^-$) by a two step reaction using two categories of bacteria which are referred to as Nitrosomonas and Nitrobacter. The Nitrosomonas can convert the ammonium ($NH_4^+$) to nitrite ($NO_2^-$), and the Nitrobacter can convert the nitrite ($NO_2^-$) to nitrate ($NO_3^-$). A genera of microbes which nitrify to nitrite include: Nitrosomonas europaea, Nitrosomonas aligocarbogenes, Nitrosospira, Nitrosococcus, and Nitrosolobus. A genera of microbes which can nitrify to nitrite include Nitrobacter agilis, Nitrobacter winogradski, Nitrospira, and Nitrococcus. The microorganisms utilize energy gained from the oxidation of ammonium to nitrite and nitrate to assimilate $CO_2$ into cell material. This process, being strictly aerobic, relies on an oxygen rich environment. The following reactions illustrate this energy yielding process:

(4) $NH_4^+ + 3/2\ O_2$ $\xrightarrow{Nitrosomonas}$ $NO_2^- + 2H^+ + H_2O$ (5) $NO_2^- + 1/2\ O_2$ $\xrightarrow{Nitrobacter}$ $NO_3^-$ The denitrification reactions involve anaerobic respiratory processes by which nitrate ion ($NO_3^-$) serves as the electron acceptor. Several genera of bacteria will, in the absence of $O_2$, switch to an anaerobic growth cycle. Exemplary microbes include Bacillus, Lactobacillus, Spirillum, Hyphomicroblum, Agrobacterium, Acinetobacter, Propionibacterium, Rhizobium, Corynebacterium, Cytophagy, Thiobacillus, Alcaligenes and Pseudomonas. Utilizing carbon rich compounds as electron donors, the energy reaction can be generally described as:

(6) $NO_3^-$ + organic carbon $\xrightarrow{bacteria}$ $NO_2^- + 1/2CO_2 + 2/3H_2O$ (7) $NO_2^-$ + organic carbon $\xrightarrow{bacteria}$ $1/2N_2 + 1/2H_2O + OH^- + 1/2CO_2$ Nitrogen is released to the environment as nitrogen gas ($N_2$).

Upon completion of the nitrification/denitrification processes, the waste water is significantly reduced in nitrogen content which means reduced nitrate content. The nitrate concentration in effluent going to the drain field can be reduced to a level of 25 mg/l or less, preferably a level of 20 mg/l or less, and more preferably a level of 10 mg/l or less. The level of nitrate and the BOD in effluent can be controlled by adjusting the recirculation ratio and/or average residence time. The recirculation ratio is defined as the number of times, on average, a volume of effluent will pass through the nitrification unit prior to removal to a drain field. The average residence time is defined as the average length of time a volume of effluent will remain in the waste water treatment system. One having skill in the art would recognize how the recirculation ratio and residence time effects nitrate concentration and BOD.

For purposes of clarification, in the case of controlling the nitrate and BOD level in effluent from domestic sewage flowing from an average size family, it is generally desirable to control the recirculation ratio to a value of about 2:1 or greater, and more preferably to a value of about 5:1 to about 12:1. Generally, the BOD can be controlled by increasing the recirculation ratio. In addition, it is generally desirable to control the residence time to about 1 to 12 days or less, and more preferably 5 to 10 days.

Figure 6:
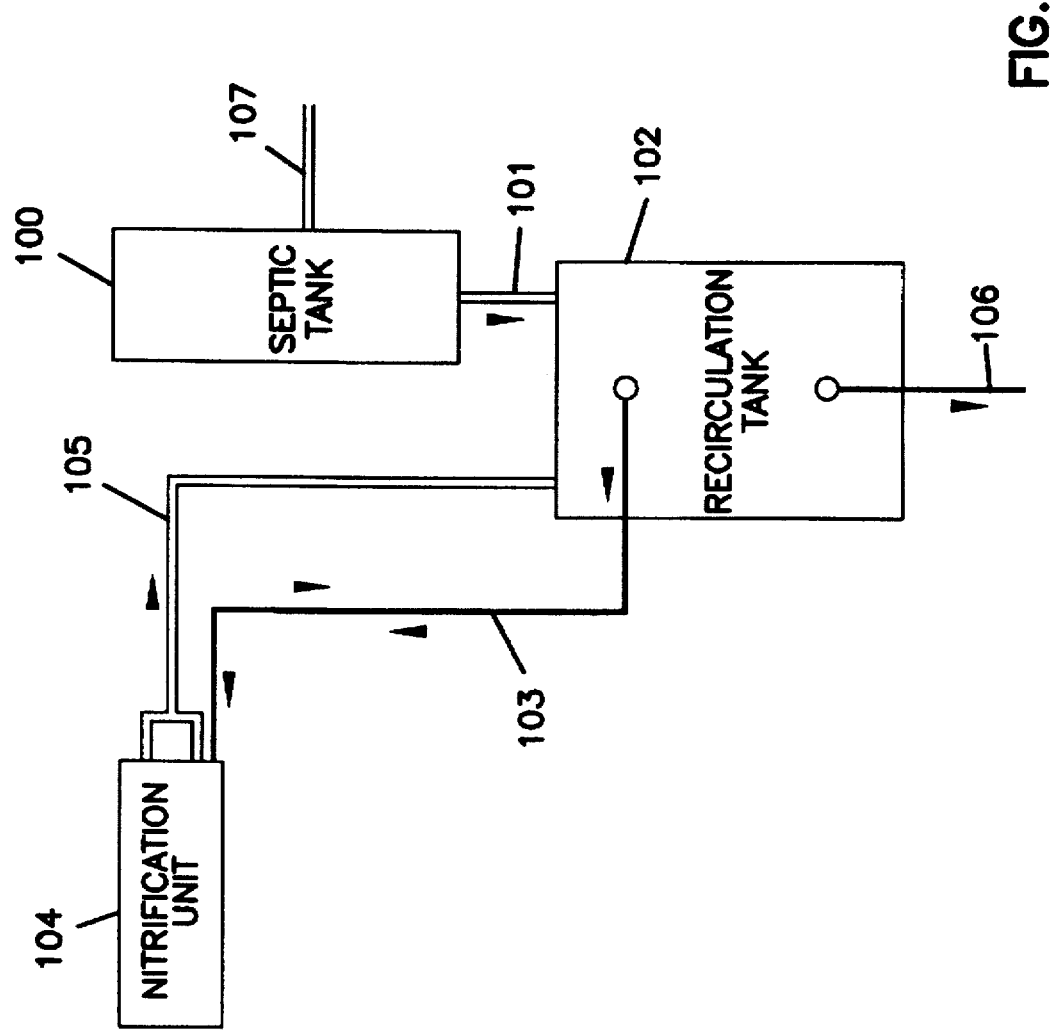
FIG. 6 is a plan schematic view of an alternative waste water treatment system according to the principles of the present invention.

The BOD can additionally be controlled by directing a portion of the nitrified effluent into the recirculation tank. FIG. 6 shows an alternative embodiment where nitrified effluent is directed from nitrification unit 104 to recirculation tank 102, bypassing septic tank 100. This arrangement can be used in place of the arrangement shown in FIG. 1.

The effluent pump is preferably activated by a programmable timer. Generally, the effluent pump can be activated at least once a day in order to keep the biological reaction area moist or wet. Preferably, it is desireable to activate the pump between about every six minutes to about every 60 minutes, and more preferably about every 20 minutes to about every 30 minutes.

Effluent is preferably discharged from the effluent distribution network through orifices in PVC pipe. Preferably, the effluent is sprayed out under pressure to maximize dispersion and promote the formation of small droplets. It can be a general goal to have a small volume to surface area ratio so oxygen diffusion into the droplets is increased.

Ammonia concentration declines and nitrate concentration increases as the effluent trickles over attached microorganisms in the biological reaction area. Oxygen is consumed by the formation of nitrate. As the effluent moves through the full depth of the nitrification unit, the oxygen concentration in the oxygen-rich environment begins to decline. At this time much of the ammonia nitrogen has been converted to nitrate nitrogen, and the nitrified effluent can be returned, by gravity, to the septic tank to be denitrified. Denitrification proceeds in an anoxic environment. As the oxygen concentration approaches 1 mg/l, the rate of denitrification approaches zero. The oxygen concentration in the septic tank is kept low (<0.01 mg/l) by the high biochemical oxygen demand (BOD) there. The source of the BOD is also a source of food for denitrifying bacteria. At this stage, nitrate nitrogen is being converted to nitrogen gas which will ultimately be liberated into the atmosphere.

The parts of the septic system can be assembled from readily available materials. For example, commercially available 1,000 gallon concrete septic tanks can be used to produce the septic tank or settling tank, the recirculation tank and the nitrification unit for use in serving an average size house. Preferably, only the lower half of a commercially available septic tank (and a cover) are needed to form the nitrification unit. In addition, plastic vessels, such as polyethylene, can be used to provide a smaller and lighter unit.

The media inside the nitrification unit is preferably ⅜ inch rock chips. Plastic or other synthetic media can be used to increase surface area to volume ratio. Preferably, the media would have a very high void space. It is desirable to maintain sufficient surface area for microbial binding sites and to provide for proper venting.

The effluent distribution network should include as few fittings as possible. Irrigation equipment, such as nozzles, spray heads, splash plates, can be used to increase the application of effluent over the media.

Heating elements can be installed within the nitrification unit to further regulate the operation temperature.

The lung is designed to provide sufficient dosing of the biological reaction area. For a lung used in a single family system, the lung can have an outside dimension of 12"×13". Since a major purpose of the lung is to aerate the nitrification unit, the size of the lung can be adjusted to provide a desired amount or degree of aeration.

This cycle repeats until the recirculation tank becomes full at which time the drain field pump delivers a volume of liquid to the soil absorption field. Although the use of two pumps is preferred, it is possible to forego the use of a drain field pump and allow the effluent to drain by gravity into the drain field.

The system of the invention controls venting with passive and forced air. Oxygen, required for nitrification and usually the limiting component, is supplied in ample quantities. The air supply can be protected from cold weather by burying the vents. If cold weather is not a problem, the vents can be exposed to the atmosphere to provide increased passive and forced venting.

The lung, exploiting the function of an effluent pump, transfers fresh, oxygen rich air into the denitrification unit from outside. The need for blowers or compressors which adds complexity and costs to the system can be eliminated. Additionally, regulatory agencies encourage systems which cannot be easily turned off or "short-circuited" by the homeowner. The lung, requiring no external power source, is tamper resistant. The lung requires no electrical connections since it uses the flowing effluent as its power source. When the lung is full, a floating ball valve inside stops flow to the air network. Effluent is then directed to the effluent distribution network located on top of the granular media.

Figure 9:
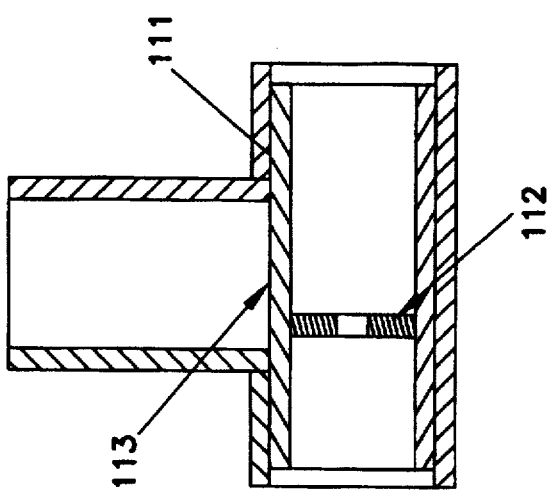
FIG. 9 is a cross-sectional view of an orifice fitting shown in the lung of FIG. 8.
Figure 8:
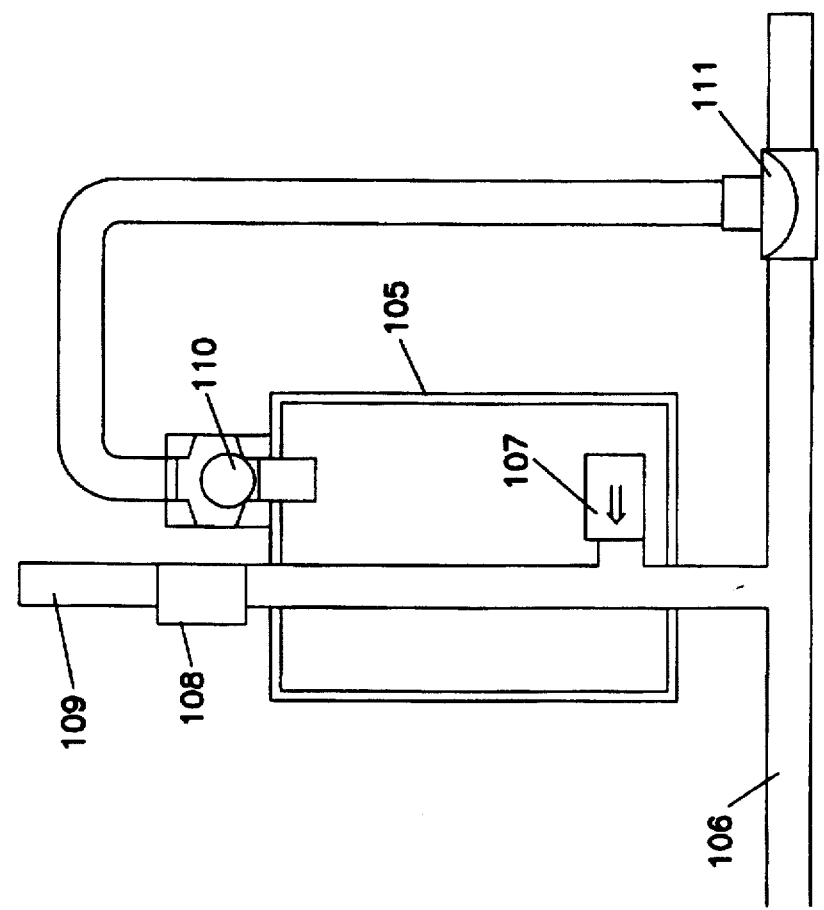
FIG. 8 is an cross-sectional view of an alternative lung which can be used in the system of FIG. 2.

An alternative embodiment of the lung is provided in FIGS. 8 and 9. Lung 105 can be used in the system described in FIG. 2, without using the air distibution network since the lung 105 provides desired aeration of the effluent. Lung 105 has pressurized line 106 which introduces effluent into lung 105. Additionally included are swing check valves 107 and 108, atmosphere vent 109, floating ball valve 110 and orifice fitting 111. Similar to lung 40, lung 105 can provide aeration to a nitrification unit. Swing check valve 107 allows the effluent to drain more quickly. A more detailed drawing of orifice fitting 111 is shown in FIG. 9. Orifice fitting 111 has orifice plate 112 having a ⅝" opening and orifice 113 which has a ⅛" opening, and advantageously takes advantage of flow principles to provide a highly aerated effluent.

Two or more lungs can be used separately or arranged for series or parallel operation. The denitrification unit can be arranged in varying configurations and in varying numbers to treat larger flows and/or different strength wastes. The sewage treatment system can easily be retro-fit existing system.

Granular media and large liquid volume of the system provide treatment stability to changing incoming waste water characteristics. Single family dwellings can vary widely in the waste water output. A treatment system should operate to provide stability under these conditions.

EXAMPLE

Figure 2:
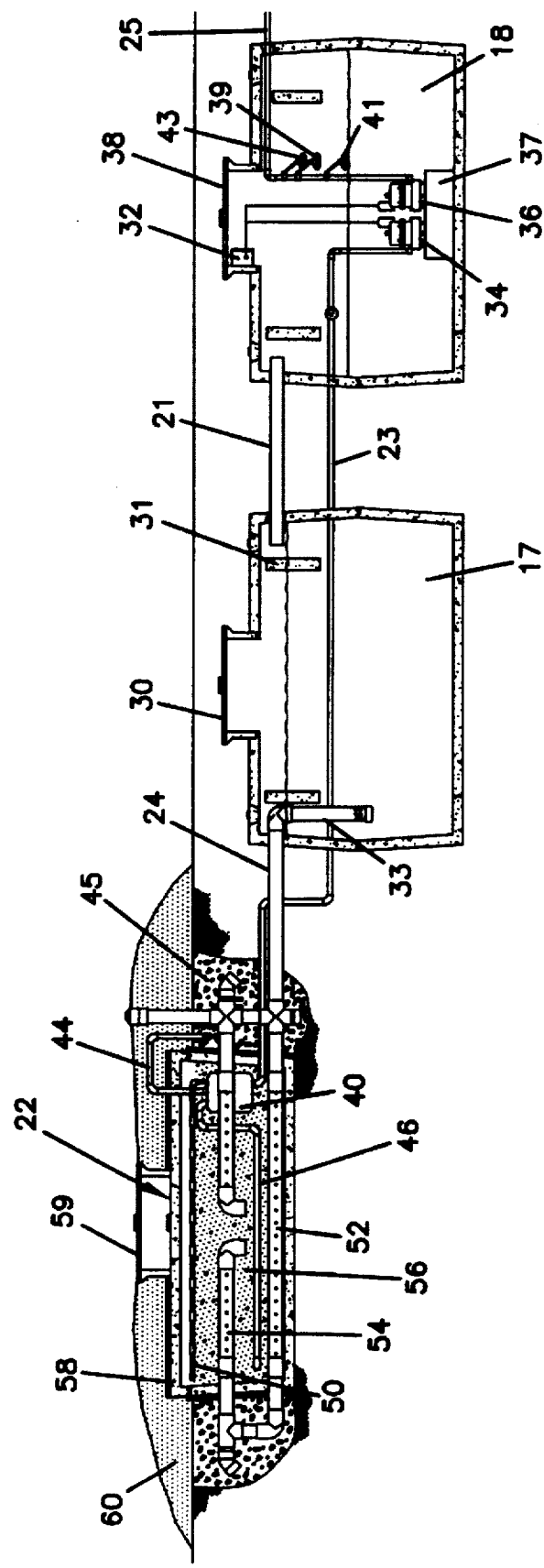
FIG. 2 is a plan cross-sectional in-ground view of the waste water treatment system shown in FIG. 1.
Figure 3:
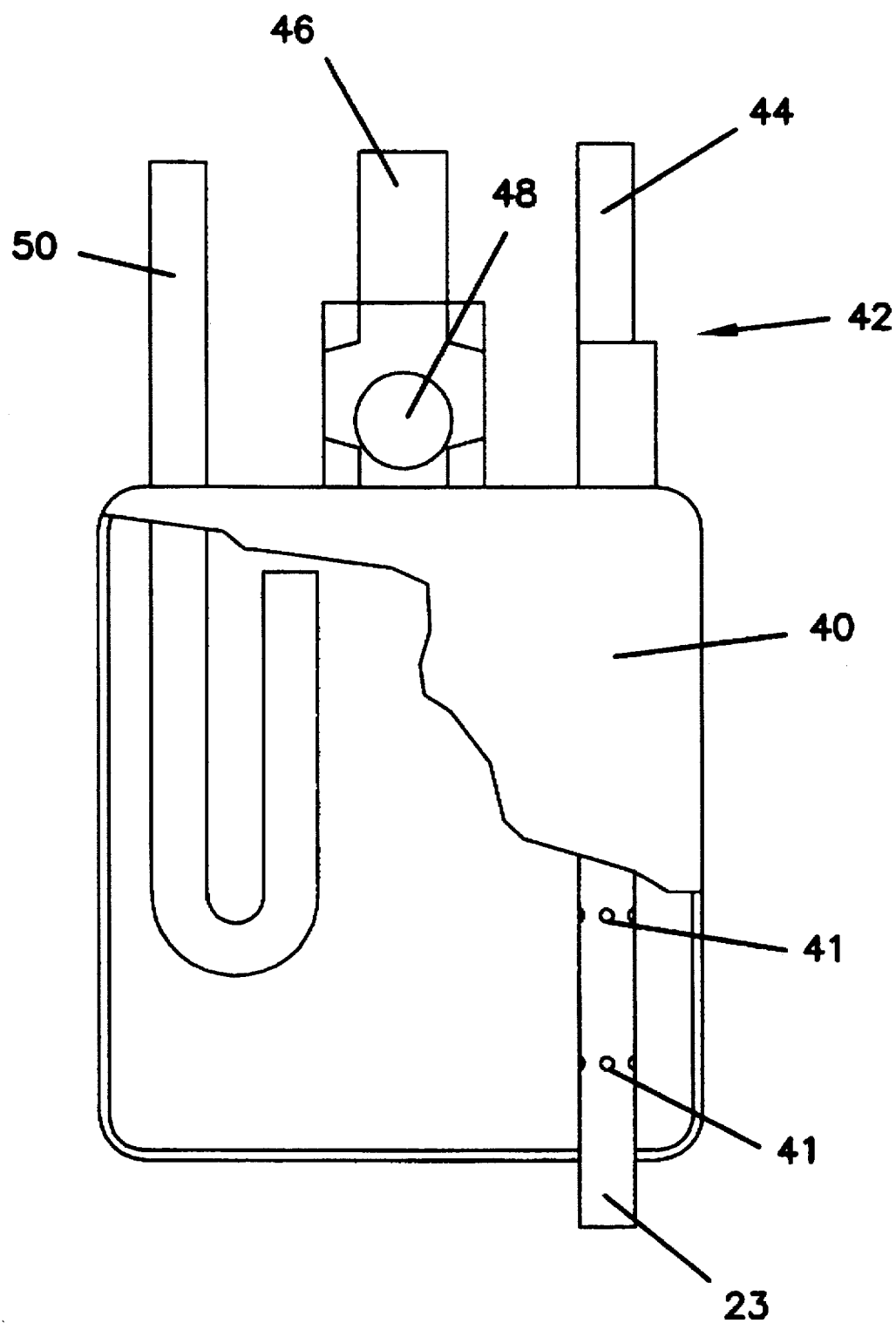
FIG. 3 is an enlarged cross-sectional view of the lung for aerating and distributing effluent to the nitrification unit shown in FIG. 1.
Figure 7:
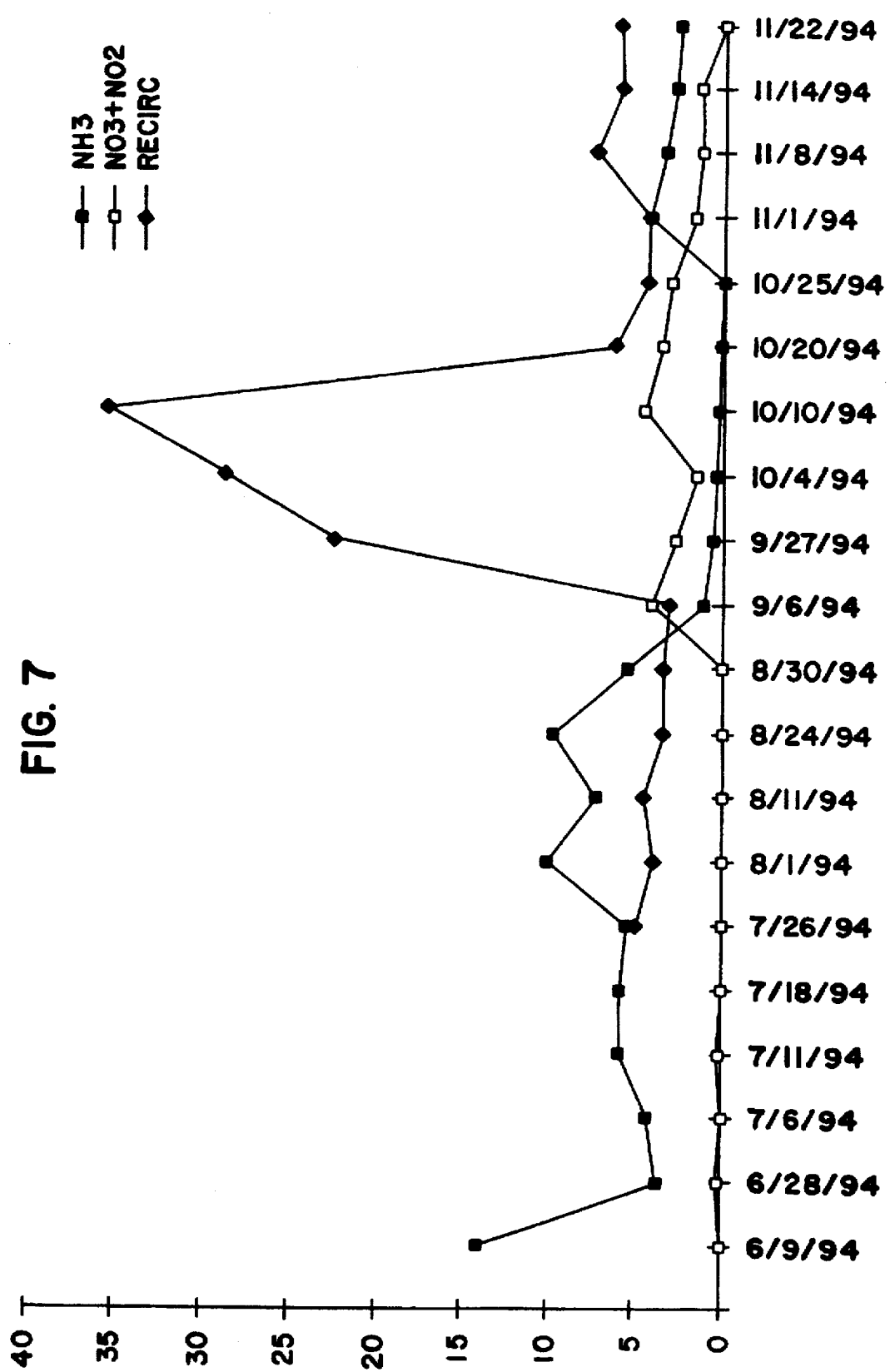
FIG. 7 is a graph showing the relationship between ammonia and nitrite and nitrite concentration as a function of recirculation.

The waste water treatment system shown in FIGS. 1 and 2 was used to treat sewage flowing at an average rate of 350–550 gallons/day from a single family home with four children in Montana. The results from monitoring this system are provided in Table 1, below. The samples tested were withdrawn from the recirculation tank. The data is graphically shown in FIG. 7.

TABLE 1

| Date | BOD | TOC | TSS | NH3 | NO3 + NO2 | TKN | PO4 | DO | Flows | Recirc. | Temp | Total N |
|---|---|---|---|---|---|---|---|---|---|---|---|---|
| 6/9/94 | 70 | 28 | 13 | 14 | 0.06 | 1.8 | 6.5 | 0 | | | | |
| 6/28/94 | | | | 3.6 | 0.14 | | | 0 | | | | |
| 7/6/94 | | | | 4.2 | 0.07 | | | 0 | | | | |
| 7/11/94 | 87 | | 44 | 5.8 | 0.12 | 8.2 | | 0 | | | | 8.32 |
| 7/18/94 | | | | 5.8 | 0.09 | | | | | | | |
| 7/26/94 | 150 | | 36 | 5.4 | 0 | 11 | | | 362.5 | 4.83 | | 11 |
| 8/1/94 | | | | 10 | 0.07 | | 7.2 | | 483.3 | 3.8 | | |
| 8/11/94 | | | | 7.2 | 0 | 13 | | | 435 | 4.39 | | 13 |
| 8/12/94 | | | | | | | | | 290 | 6.32 | | |
| 8/24/94 | | | | 9.7 | 0 | | | | 547.78 | 3.32 | | |
| 8/30/94 | | | | 5.4 | 0 | | | | 531.67 | 3.35 | | |
| 9/6/94 | 110 | 15 | 28 | 1.1 | 4 | 4.3 | | | 455.71 | 3.06 | | 8.3 |
| 9/27/94 | | | | 0.55 | 2.7 | | | | 524.76 | 22.47 | | |
| 10/4/94 | 38 | 25 | 26 | 0.37 | 1.5 | 9 | 5.9 | | 538.57 | 28.71 | | 10.5 |
| 10/10/94 | 94 | 29 | | 0.23 | 4.5 | | | | 483.33 | 35.52 | | |
| 10/20/94 | | | | 0.16 | 3.5 | | | | 409.09 | 6.25 | 57.2 | |
| 10/25/94 | | | | 0 | 3 | | | | 375 | 4.4 | 57.2 | |
| 11/1/94 | | | | 4.2 | 1.7 | | | | 375 | 4.4 | 55.2 | |
| 11/8/94 | 61 | 7.5 | 57 | 3.4 | 1.3 | 7.2 | | | 321.4 | 7.37 | 52.2 | 8.5 |
| 11/14/94 | | | | 2.78 | 1.4 | | | | 357.14 | 5.87 | 51.2 | |
| 11/22/94 | | | | 2.6 | 0.09 | | | | 357.14 | 5.98 | 48.9 | |
| Averages | 87.1 | 20.9 | 34 | 4.3 | 1.212 | 7.9 | 6.53 | 0 | 427.96 | 9.37 | 53.65 | 9.93 |

While the invention has been described in conjunction with a specific embodiment thereof, it is evident that different alternatives, modification, variations, and uses will be apparent to those skilled in the art in view of the foregoing description. Accordingly, the invention is not limited to these embodiments or the use of elements having specific configurations and shapes as presented herein.

What is claimed is:

1. An apparatus for modifying waste water comprising:
    an ammonification and denitrification region having a substantially anaerobic environment, a nitrification region having a substantially aerobic environment, and an effluent drainage region;
    said ammonification and denitrification region comprising a first inlet for receiving raw sewage, a second inlet for receiving nitrified effluent, a first outlet and conduit connecting said ammonification and denitrification region to said nitrification region, a pump in said ammonification and denitrification region for pumping clarified effluent through said first outlet and conduit, and a second outlet and conduit for discharging clarified effluent to said effluent drainage region,
    said nitrification region comprising a biological reaction area, an effluent distribution network constructed and arranged to distribute clarified effluent into the biological reaction area, an air distribution network constructed and arranged to distribute air into the biological reaction area, and a collection network constructed and arranged for collecting nitrified effluent from the biological reaction area and discharging to said ammonification and denitrification region, and said effluent drainage region comprising an absorption field for discharging clarified effluent, wherein said nitrification region further comprises a container for alternately filling with air and clarified effluent, said container for alternately filling with air and clarified effluent comprising:

an effluent inlet/outlet which provides effluent under pressure to said container and which allows effluent to drain from said container;

an air inlet comprising a valve which closes as effluent under pressure enters said container and which opens when effluent drains from said container;

an air outlet comprising a valve which opens as effluent under pressure enters said container and which closes as effluent drains from said container; and an effluent outlet constructed and arranged to allow effluent to exit said container when said container is filled with effluent and effluent under pressure enters said container.

2. The apparatus for modifying waste water according to claim 1 wherein said ammonification and denitrification region further comprises a settling tank and a recirculation tank constructed in series, said settling tank comprises the first inlet and the second inlet, and a third outlet and conduit for communication with said recirculation tank, said settling tank constructed and arranged to provide gentle mixing of the raw sewage and the nitrified effluent and settling of heavy components, said recirculation tank comprises the first outlet and conduit and the second outlet and conduit, and an inlet for communication with said settling tank.

3. The apparatus for modifying waste water according to claim 1, said container constructed and arranged for distributing clarified effluent to the effluent distribution network and for distributing air to the air distribution network.

4. An apparatus for distributing effluent and air to an environment comprising a container for alternately filling with air and effluent, said container comprising:

an effluent inlet/outlet which provides effluent under pressure to said container and which allows effluent to drain from said container;

an air inlet comprising a valve constructed and arranged to close as effluent under pressure enters said container and open to allow air under atmospheric pressure to enter said container when effluent drains from said container through said effluent inlet/outlet;

an air outlet comprising a valve constructed and arranged to open as effluent under pressure enters said container and close as effluent drains from said container; and an effluent outlet constructed and arranged to allow effluent to exit said container when said container is filled with effluent and effluent under pressure enters said container.

5. The apparatus for distributing effluent and air to an environment according to claim 4, wherein said air inlet valve comprises a swing check valve.

6. The apparatus for distributing effluent and air to an environment according to claim 4, wherein said air outlet valve comprises a floating ball valve.

7. The apparatus for distributing effluent and air to an environment according to claim 4, wherein the effluent outlet comprises an air lock to prevent air from exiting said container therethrough.

8. The apparatus for distributing effluent and air to an environment according to claim 4, wherein the apparatus is provided for distributing effluent and air to a nitrification region in a system for modifying waste water.

* * * * *

UNITED STATES PATENT AND TRADEMARK OFFICE
CERTIFICATE OF CORRECTION

PATENT NO. :   5,676,828

DATED      :   OCTOBER 14, 1997

INVENTOR(S) : KALLENBACH ET AL.

It is certified that error appears in the above-identified patent and that said Letters Patent is hereby corrected as shown below:

Col. 4, line 16: "adove" should read --above--

Col. 8, line 8: insert --60-- after the word "backfill"

Signed and Sealed this

Fifth Day of May, 1998

Attest:

BRUCE LEHMAN

Attesting Officer

Commissioner of Patents and Trademarks